United States Patent [19]

Kuschel

[11] Patent Number: 5,076,420
[45] Date of Patent: Dec. 31, 1991

[54] CLUTCH ASSEMBLY FOR A ZONED LIVE CONVEYOR

[76] Inventor: David Kuschel, E7383 Nietzke Rd., Clintonville, Wis. 54929

[21] Appl. No.: 636,595

[22] Filed: Jan. 2, 1991

[51] Int. Cl.$^5$ ............................................. B65G 13/06
[52] U.S. Cl. .................................. 198/781; 198/790
[58] Field of Search ................ 198/781, 790, 791, 789

[56] References Cited

U.S. PATENT DOCUMENTS

| | | |
|---|---|---|
| 2,712,377 | 7/1955 | Eggleston . |
| 3,122,232 | 2/1964 | Burt . |
| 3,567,010 | 3/1971 | Stein . |
| 3,605,990 | 9/1971 | Cowen, Jr. . |
| 3,616,894 | 11/1971 | Koennecke et al. ................ 198/781 |
| 3,840,110 | 10/1974 | Molt et al. . |
| 4,164,998 | 8/1979 | DeGood et al. ..................... 198/781 |
| 4,286,441 | 9/1981 | Scheneman, Jr. et al. ..... 198/781 X |
| 4,325,474 | 4/1982 | Rae ..................................... 198/781 |
| 4,366,899 | 1/1983 | Doro ................................... 198/781 |
| 4,406,360 | 9/1983 | Smith et al. ......................... 198/781 |
| 4,421,224 | 12/1983 | Dingman ............................ 198/781 |
| 4,508,212 | 4/1985 | Bolle et al. ......................... 198/781 |
| 4,524,861 | 6/1985 | Matsushita ......................... 198/781 |
| 4,706,801 | 11/1987 | Vessey ................................ 198/781 |
| 4,781,283 | 11/1988 | Bentley et al. ................. 198/781 X |
| 4,993,541 | 2/1991 | Roh .................................... 198/781 |

OTHER PUBLICATIONS

Hytrol Conveyors General Catalog Page Depicting Model 2514-CRA Conveyor, Published in 1989.

Primary Examiner—D. Glenn Dayoan
Attorney, Agent, or Firm—Andrus, Sceales, Starke & Sawall

[57] ABSTRACT

A clutch and declutch assembly is disclosed for live conveyors that is particularly suitable for conveyors having sections of zones. The clutch assembly has a clutch biasing spring and nut assembly which causes inner and outer driven clutch members to frictionally engage the driving clutch member. The clutch also has a torque limiting feature and a declutching feature. Declutching is performed by expanding a bladder or a hydraulic cylinder, causing a clutch release plate to axially move the outer driven clutch member to disengage with the driving clutch member. A zoned live conveyor is obtained by using at least one live roller, sensor and valve in each zone. When the presence of a load unit in a zone is sensed, a sensing signal is sent to a central control unit, which in turn operates a valve to expand a bladder or cylinder that axially move the clutch release plate to declutch the roller. A variety of control logics can be programmed into the control unit and are easily changed.

33 Claims, 2 Drawing Sheets

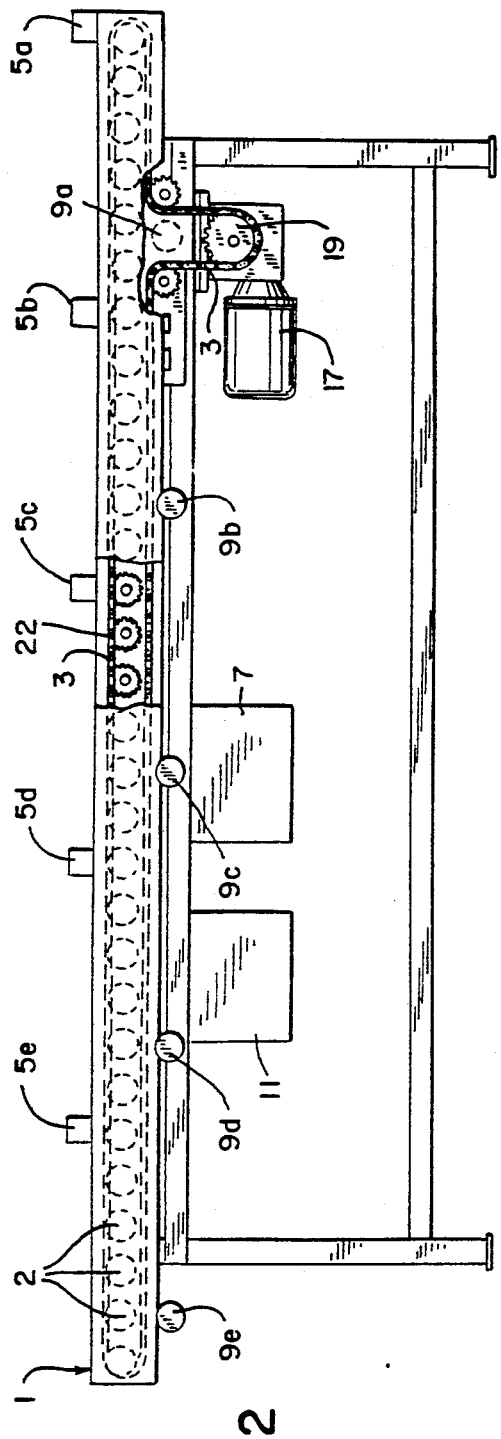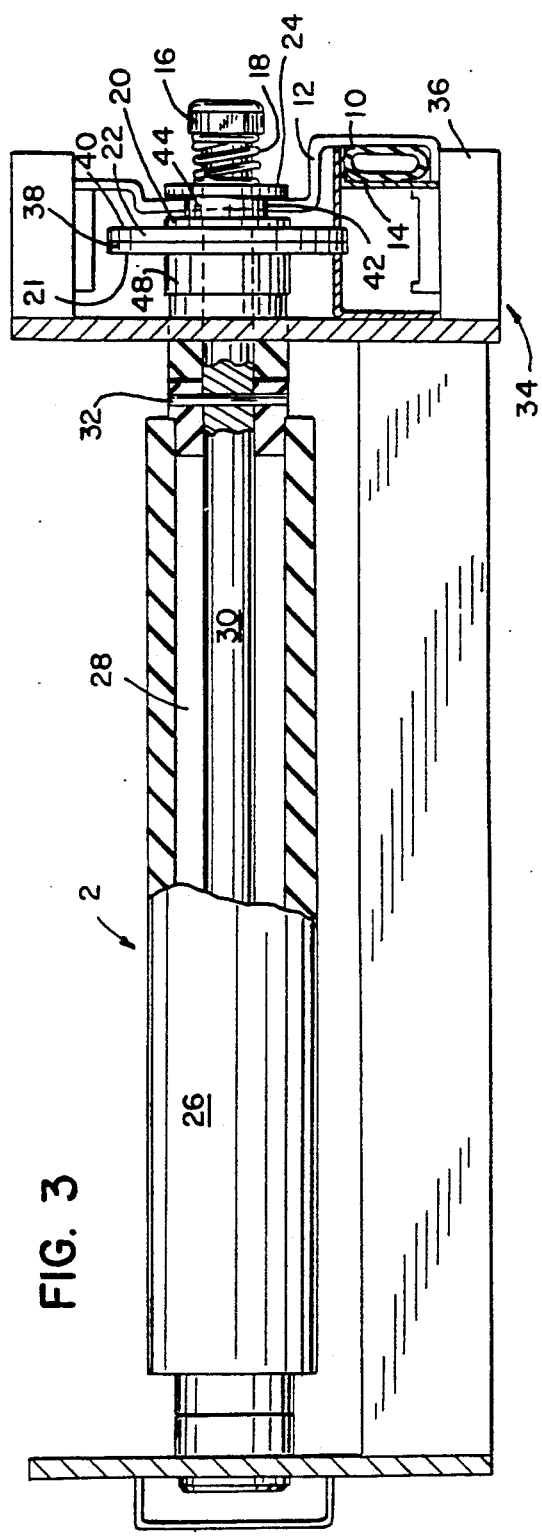

CLUTCH ASSEMBLY FOR A ZONED LIVE CONVEYOR

BACKGROUND OF THE INVENTION

This invention relates to live conveyors, and more particularly to clutches for zoned or sectionalized live conveyors.

A number of live conveyor systems are known in which the driven element stops rotating when a load placed on it exceeds a predetermined torque limit. The torque limit may be exceeded when the weight of the load unit on the live roller is too high, or when the load unit encounters an obstacle on the conveyor such as another load unit that has stopped moving.

A major disadvantage with such conveyor systems is that the load units are allowed to contact each other before the live roller stops moving. When the load units are fragile or easily damaged, it is highly undesirable to allow them to touch each other.

To prevent the load units from touching each other, a number of sectionalized or zoned conveyors have been created. Typical zoned conveyors have a number of sections or zones, each zone having a sensor and a motor drive clutch apparatus. Each zone also typically has its own belt and its own means for engaging the clutch apparatus. The presence of a load unit in one zone may affect the movement of a load unit in the same or a different zone.

A major disadvantage of the typical prior art zoned conveyors is that they are complicated and expensive, and often contain numerous belts, pulleys, motors, and control units to operate. Typical zoned conveyors also require that the conveyor be specially made or extensively modified to incorporate the zoned drive features. They may not be retrofit onto existing live conveyors.

Although prior art live conveyor clutch assemblies and zone drive systems may disengage the drive means from the live rollers, they do not prevent the roller from rotating if the conveyor is placed in an upward or downward direction. That is, the effect of gravity on the load unit when the conveyor section is at an angle with respect to the horizontal plane may cause the disengaged roller to rotate and the load unit to move, allowing the load unit to strike and damage adjacent load units.

It is therefore desirable to provide an inexpensive zoned live conveyor system that is retrofitable and usable on flat as well as upward and downward applications.

SUMMARY OF THE INVENTION

A clutch assembly is disclosed for use with a live roller of a chain-driven roller conveyor. The unique clutch assembly provides torque limiting, as well as declutching and braking to stop roller movement. A plurality of clutch assemblies may be combined with sensors, valves, and a central control unit to provide a plurality of zones on the conveyor.

The clutch assembly preferably includes an inner driven clutch member interconnected with a coaxial shaft whose shaft axis is coaxial with the longitudinal axis of the live roller, the inner driven clutch member engaging an inner surface of a driving clutch member such as a sprocket. The clutch assembly also includes an axially-movable outer driven clutch member interconnected with the coaxial shaft that engages an outer surface of the driving clutch member, and a clutch biasing means for axially moving the outer clutch member so that it engages the outer surface of the driving clutch member to rotate the coaxial shaft and the roller with the rotation of the driving clutch member.

The clutch assembly also has a torque limiting feature so that when the load unit force exceeds a predetermined torque limit, the inner driven clutch member and the outer driven clutch member slide with respect to the inner and outer surfaces of the driving clutch member, causing the roller to stop rotating.

The motor drive for the live roller can be disengaged or declutched by a clutch release member that cooperates with a declutch biasing means, a sensing means, a valve and a control unit. The declutch biasing means preferably includes an expandable bladder connected to an air pressure source through the valve. The valve is responsive to a sensing means, such as a photoelectric cell, that sense the presence of a load unit on the conveyor. The sensing means preferably outputs a sensing signal to a control unit, which in turn operates the valve.

When a load unit is sensed, the control unit may open the valve, enabling the air pressure source to pressurize and expand the expandable bladder. The declutch biasing means—including the expandable bladder—axially moves a clutch release member to disengage the outer clutch member connected thereto in response to the opening of the valve. When the sensing means no longer senses the presence of a load unit, the control unit sends a signal to close the valve, enabling the expandable bladder to deflate and causing the clutch to re-engage the driving clutch member.

In a preferred embodiment, the live conveyor is divided into a plurality of zones, each zone having at least one clutch assembly, sensor, and valve. Each valve and thus each clutch is subject to the control of a central control unit. The control unit may control a valve located in the same zone as the sensing unit, or it may control a valve located in another zone.

Braking is achieved in the clutch assembly by a flange that is interconnected with the outer clutch member. The flange has a flange surface that frictionally engages the clutch release member when the declutch biasing means moves the clutch release member to disengage the clutch. The frictional forces between the flange surface and the clutch release member prevent the movement of the live roller, resulting in braking action.

It is a feature and advantage of the present invention to provide a simple and inexpensive clutch and declutch assembly for a live roller.

It is yet another feature and advantage of the present invention to provide a zoned conveyor system that may be easily retrofit onto existing live roller conveyors.

It is yet another feature and advantage of the present invention to provide a clutch assembly that includes braking action to enable the clutch to be used on upward and downward live roller conveyors.

It is yet another feature and advantage of the present invention to provide an inexpensive zoned lived conveyor system having a small number of parts.

These and other features and advantages of the present invention will be apparent to those skilled in the art from the following detailed description of preferred embodiments and the drawings, in which:

BRIEF DESCRIPTION OF THE DRAWINGS

FIG. 2 is a side view of the zoned conveyor system, excluding the electrical and pneumatic lines.

FIG. 3 is a side view, shown in partial cross-section, of a live roller incorporating the clutch assembly according to the present invention.

DETAILED DESCRIPTION OF PREFERRED EMBODIMENTS

Figure 1:
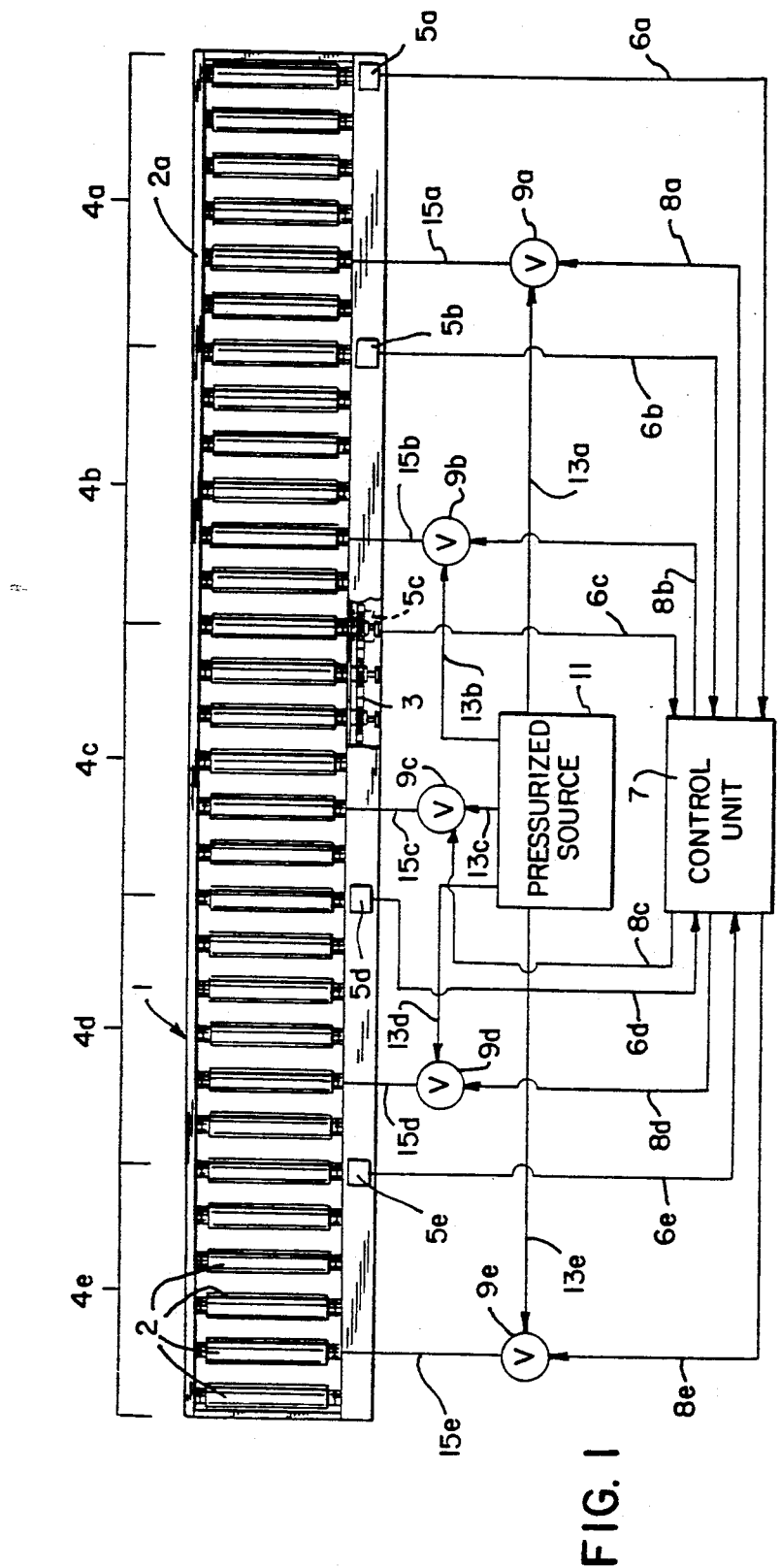
FIG. 1 is a schematic diagram depicting the zoned live conveyor assembly according to the present invention.

FIG. 1 is a schematic diagram of a preferred zoned live conveyor system according to the present invention. In FIG. 1, conveyor 1 has a plurality of rollers 2 at least some of which engage the continuous chain 3 so as to be "live" rollers. All of the rollers could be live rollers, or in the alternative, the live rollers may be spaced between the other rollers that are not connected to the drive mechanism.

In any case, the conveyor assembly is preferably divided into a plurality of zones 4a–4e. In FIG. 1, each zone is shown as consisting of six rollers, one of which is a live roller. In general, the width of a zone and thus the total number of rollers in a zone would most likely be chosen to be somewhat longer than the length of a single load unit.

Referring again to FIG. 1, zones 4a–4e have sensors 5a–5e respectively. Each zone has at least one sensor, although two or more sensors may be used in a single zone. Sensors 5a–5e send sensing signals via lines 6a–6e respectively to a single control unit 7. Sensors 5a–5e are preferably photoelectric cells since such cells have no moving parts and do not make physical contact with the load units. One suitable photocell for the sensing means is a Banner 900 series programmable photocell. However, other types of sensors could be used, including any of a wide variety of manual switches, such as limit switches, that have a lever which contacts the load unit or which is depressed by the weight of the load unit to activate the valves.

The control unit is preferably a programmable microprocessor or other programmable central processing unit (CPU). If a manufacturing operation is being performed on the load units which uses a control unit, control unit 7 may be the same control unit used for the manufacturing operation.

When control unit 7 receives a sensing signal from a particular sensor, it sends a valve control signal via the corresponding line of lines 8a–8e to operate one or more of valves 9a–9e. If control unit 7 receives a sensing signal from a particular sensor, it may control the operation of a valve in that same zone, in another zone, or in a plurality of zones.

Valves 9a–9e are preferably pneumatically-controlled solenoid valves. Other valves could be used, including hydraulic or manually-operated ones, such as foot or hand operated valves.

Assuming that pneumatic valves are used for valves 9a–9e, an air pressure source 11 supplies compressed air to valves 9a–9e via lines 13a–13e respectively. When valves 9a–9e are open, the compressed air is provided to the respective expandable bladders (FIG. 3) of the clutch assemblies (FIG. 3) via lines 15a–15e respectively. The compressed air operates the declutching and braking mechanism as described below in connection with FIG. 3.

If hydraulic valves are used for valves 9a–9e, air pressure source 11 is replaced by a pressurized fluid source.

The zoned conveyor assembly of FIG. 1 operates in the following manner. When a load unit is placed on the righthand side of conveyor 1, its presence is sensed by sensor 5a in zone 4a. Sensor 5a sends a sensing signal via line 6a to control unit 7. In turn, the control unit sends a control signal to valve 9a via line 8a, and may send control signals via one or more of lines 8b through 8e to the other zones. If the control signal opens the valve, the declutch biasing means causes the chain drive to be disengaged from the live roller, and the roller stops rotating If the control signal closes the valve, the drive means is re-engaged and the live roller begins rotating.

A wide variety of control signal logics could be used to control the movement of different load units in the various zones, depending upon the particular application. It is therefore desirable to use a programmable control unit 7 so that the zone control logic may be easily changed. For example, the presence of a load unit in zone 4a as detected by sensor 5a may cause control unit 7 to shut off valves 9a through 9e, thereby causing any other load units in zones 4b through 4e to advance.

Another control logic scheme in the above example may cause valve 9b to close, thereby advancing a load unit from zone 4b to zone 4c when a load unit in zone 4a is detected. At the same time, a control signal may be sent to valve 9a in zone 4a to cause the associated live roller 2a to stop until the load unit in zone 4b has advanced to zone 4c. In other words, an override control signal may be sent by the control unit to a particular valve to close the valve—even though a load unit is sensed in that zone—to allow the load unit to advance to the next zone.

FIG. 2 is a side view of a live conveyor assembly according to the present invention. In FIG. 2, as in all of the figures, components having corresponding functions have been given the same numerical designations. In FIG. 2, motor 17 drives a sprocket gear 19 which engages chain 3. The movement of chain 3 rotates driving clutch element or sprocket 22 as more fully described below in connection with FIG. 3.

FIG. 3 is a side view shown in partial cross-section of a live roller and clutch assembly according to the present invention. In FIG. 3, roller assembly 2 has a roller member 26 that includes a roller shaft 28. Roller shaft 28 has a shaft axis that is parallel to and preferably coaxial with the longitudinal axis of roller member 26. Roller shaft 28 substantially surrounds a portion of a coaxial shaft 30. Coaxial with roller shaft 28 is a coaxial shaft 30 that is retained in place via a removable pin 32. Coaxial shaft 30 also has a shaft axis that is parallel to and preferably coaxial with the roller's longitudinal axis. Note that pin 32 is readily accessible, so that the removal of pin 32 and of nut 16 on the threaded end of coaxial shaft 30 enables the entire shaft 30 to be easily removed.

Roller shaft 28 and coaxial shaft 30 may be combined into a single, integral shaft. As used herein, the term "first shaft" refers to either roller shaft 28 or to coaxial shaft 30, or to any integral shaft that combines the roller shaft and the coaxial shaft.

At one end of coaxial shaft 30 is the clutch assembly 34 according to the present invention. Clutch assembly 34 includes a clutch housing 36 that protects some of the clutch components from the environment. Clutch assembly 34 also includes an inner clutch member 21, an outer clutch member 20, a flange 24 having a recess 42 therein in which clutch release plate 12 sits, a clutch biasing means, consisting of nut 16 and spring 18 that surrounds a portion of shaft 30 and located between nut 16 and outer clutch member 20, and a declutch biasing means consisting of an expandable bladder 10, clutch release plate 12, and a wall 14.

Flange 24 is preferably a standard clutch bushing, similar to bushing 48, except that a recess 42 has been machined into it for the seating of clutch release plate 12.

The clutch biasing means, consisting of nut 16 and spring 18, biases outer clutch member 20 via flange 24—which is interconnected with outer clutch member 20—against driving clutch member 22 to keep driving clutch member 22 in frictional engagement with inner and outer driven clutch members 21 and 20.

Nut 16 is adjusted, and the spring force of spring 18 is chosen, so that the torque on roller 26 only reaches a particular torque limit. Once the torque limit is exceeded, as when the load unit is too heavy or when the load unit encounters an obstacle, roller 26 stops rotating. When the load unit is below the predetermined limit, an inner surface 38 of driving clutch member 22 frictionally engages a surface of inner driven clutch member 21, while at the same time an outer surface 40 of driving clutch member 22 frictionally engages a surface of outer driven clutch member 20.

When clutch assembly 34 is to be disengaged, expandable bladder 10 is filled with compressed air or pressurized fluid as described above. Bladder 10 could be replaced by a hydraulic cylinder if a pressurized fluid is used. Since wall 14 is immovable, the expansion of bladder 10 causes clutch release plate 12 to move in an axial direction, parallel to the roller's longitudinal axis, away from driving clutch member 22. This axial movement of clutch release plate 12 causes plate 12 to frictionally engage a flange surface 44 of flange 24, causing flange 24 to also move in an axial direction away from driving clutch member 22. Since flange 24 is connected to outer driven clutch member 20, member 20 also moves in an axial direction away from driving clutch member 22, causing inner clutch member 21 and outer clutch member 20 to disengage driving clutch member 22. This disengagement causes the roller assembly 2 to stop rotating.

At the same time, braking action is achieved by the frictional engagement between clutch release plate 12 and flange surface 44. Expanded bladder 10 keeps clutch release member 12 in frictional engagement with flange surface 44, preventing flange 24 and the live roller assembly interconnected therewith from rotating. This braking feature is particularly desirable on conveyors which are non-horizontal; i.e. those in which travel is in an upward or downward direction. Without this braking mechanism, any load unit located on an upward or downward slope of the conveyor would roll downward due to gravity when declutching occurs, possibly causing the load unit to crash into another load unit or to fall off the conveyor. In the present invention, however, the braking action retains the load unit in its place, thereby preventing the undesirable downward movement of the load unit after declutching Although the declutch biasing means described herein has been described as a pneumatic system, a hydraulic system could be used in its place. In that event, a pressurized hydraulic fluid from a pressurized source would pass through a hydraulic valve operable in response to the control unit's control signal, and the pressurized fluid would be used to either expand bladder 10 or to expand a hydraulic cylinder. A mechanical linkage could also be used in place of the expandable bladder.

The zoned conveyor system according to the present invention may be retrofit onto existing live conveyors without major modification to the existing conveyor. To perform such a retrofit, clutch assemblies are installed on the desired live rollers, and each conveyor zone is fitted with the appropriate sensors, valves, electrical wiring, and air or fluid lines. All of the sensors and valves are then electrically wired to a central control unit.

The control unit may also have a means for overriding the sensing signal provided by the sensing means. The override means enables the control unit to output an override control signal to a valve to close the valve even if a load unit is sensed in that zone or in an adjacent zone. The closing of the valve causes the clutch to re-engage the driving clutch member, allowing the load unit to move forward. Such an overriding means may be desirable in a demand system where the conveyor is designed to feed parts to a machine on a demand basis.

Figure 4:
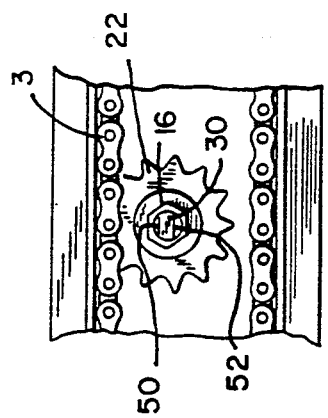
FIG. 4 is an end view of a live roller having the clutch assembly according to the present invention.

FIG. 4 is a side view of a live roller assembly according to the present invention. In FIG. 4, the roller assembly has a coaxial shaft 30 that is substantially circular in cross-section, but has two flat sides 50 and 52. The purpose of flat sides 50 and 52 is to enable coaxial shaft 30 be interconnected with driving clutch member 22, flange 24, inner driven clutch member 21, and outer driven clutch member 20 without the need for additional pins or other means for attaching and preventing the rotating of the clutch components with respect to coaxial shaft 30. Thus, shaft 30 is easily removed by simply unscrewing nut 16, removing pin 32 (FIG. 3), and pulling shaft 30 in an axial direction. Clutch components 20, 21, 22 and 24 all have apertures therein that correspond to the cross-sectional shape of coaxial shaft 30. That is, these clutch components have apertures that are substantially circular in cross-section with two flat sides to prevent the clutch members from rotating relative to coaxial shaft 30.

While particular embodiments of the present invention have been shown and described, other alternate embodiments will be apparent to those skilled in the art and are within the intended scope of the present invention Thus, the invention is to be limited only by the following claims.

I claim:

1. A clutch assembly for use with a live roller of a chain-driven roller conveyor, said live roller having a driving clutch member interconnected therewith that engages a chain drive, said live roller also having a longitudinal axis and a first shaft having a shaft axis that is parallel to said longitudinal axis, said clutch assembly comprising:
an inner driven clutch member interconnected with said shaft that engages an inner surface of said driving clutch member;
an axially-movable outer driven clutch member interconnected with said shaft that engages an outer surface of said driving clutch member;
clutch biasing means for axially moving said outer clutch member so that said outer clutch member engages said driving clutch member to rotate said shaft upon the rotation of said driving clutch member;
a clutch release member interconnected with said outer clutch member;
sensing means for sensing the presence of a load unit on said conveyor and for outputting a sensing signal when a load unit is present;
a valve operable in response to said sensing signal; and
declutch biasing means for axially moving said clutch release member to disengage said outer clutch member from said driving clutch member in response to the operation of said valve.

2. The clutch assembly of claim 1, further comprising:
control means, connected to said sensing means and to said valve, for operating said valve in response to said sensing signal 3. The clutch assembly of claim 2, wherein said control means includes a microprocessor.

4. The clutch assembly of claim 1, wherein said inner clutch member frictionally engages said inner surface, and wherein said outer clutch member frictionally engages said outer surface.

5. The clutch assembly of claim 1, further comprising:
a roller shaft that substantially surrounds and is coaxial with a portion of said first shaft; and
a pin extending into said roller shaft and into said first shaft to prevent said roller shaft from rotating relative to said first shaft.

6. The clutch assembly of claim 5, wherein said pin is removable.

7. The clutch assembly of claim 1, wherein said first shaft has a substantially circular cross-section with at least one flat side.

8. The clutch assembly of claim 1, wherein said first shaft has a threaded end, and wherein said clutch biasing means includes:
a nut on the threaded end of said first shaft; and
a spring that surrounds a portion of said first shaft and that is located between said nut and said outer driven clutch member.

9. The clutch assembly of claim 1, further comprising:
an axially-movable flange that engages said clutch release member and is interconnected with said outer clutch member.

10. The clutch assembly of claim 9, wherein said flange has a recess in which said clutch release member is seated.

11. The clutch assembly of claim 9, wherein said flange has a flange surface that engages said clutch release member to minimize rotation of said live roller.

12. The clutch assembly of claim 1, wherein said declutch bias means includes:
an expandable member in air or fluid flow communication with said valve, said expandable member axially moving said clutch release member.

13. The clutch assembly of claim 1, wherein said sensing means includes a photoelectric cell.

14. The clutch assembly of claim 1, wherein said sensing means includes a mechanical switch that contacts the load unit.

15. The clutch assembly of claim 1, wherein said valve is a pneumatic solenoid valve.

16. The clutch assembly of claim 1, wherein said valve is a hydraulic valve.

17. A live roller conveyor having a plurality of successive zones controlled by a control unit, each zone comprising:
at least one chain-driven live roller assembly having a longitudinal axis, including:
a driving clutch member that engages a chain drive, said driving clutch member having an inner surface and an outer surface;
a first shaft having a shaft axis that is parallel to said longitudinal axis;
a clutch interconnected with said live roller assembly, including:
an inner driven clutch member interconnected with said shaft that engages the inner surface of said driving clutch member;
an axially-movable outer driven clutch member interconnected with said shaft that engages the outer surface of said driving clutch member;
clutch biasing means for axially moving said outer clutch member so that said outer clutch member engages said outer surface of said driving clutch member to rotate said shaft upon the rotation of said driving clutch member;
a clutch release member interconnected with said outer clutch member;
declutch biasing means for axially moving said clutch release member to disengage said outer clutch member from said driving clutch member;
sensing means for sensing the presence of a load unit on said conveyor and for outputting a sensing signal to said control unit; and
a valve responsive to a control signal from said control unit, the operation of said valve controlling the declutch biasing means of a clutch in the same zone or in another zone.

18. The live roller conveyor of claim 17, further comprising:
means for overriding said control signal.

19. The live roller conveyor of claim 17, wherein said control unit includes a microprocessor.

20. The live roller conveyor of claim 17, wherein a valve in another zone is also responsive to said control signal.

21. The roller conveyor of claim 17, wherein said inner clutch member frictionally engages said inner surface, and wherein said outer clutch member frictionally engages said outer surface.

22. The roller conveyor of claim 17, wherein said roller assembly further comprises:
a roller shaft that substantially surrounds and is coaxial with a portion of said first shaft; and
a pin extending into said roller shaft and into said first shaft to prevent said roller shaft from rotating relative to said first shaft.

23. The roller conveyor of claim 22, wherein said pin is removable.

24. The roller conveyor of claim 17, wherein said first shaft has a substantially circular cross-section with at least one flat side.

25. The roller conveyor of claim 17, wherein said first shaft has a threaded end, and wherein said clutch biasing means includes:
a nut on the threaded end of said first shaft; and
a spring that surrounds a portion of said first shaft and that is located between said nut and said outer driven clutch member.

26. The roller conveyor of claim 17, wherein said clutch further comprises:
an axially-movable flange that engages said clutch release member and is interconnected with said outer clutch member.

27. The roller conveyor of claim 26, wherein said flange has a recess in which said clutch release member is seated.

28. The roller conveyor of claim 26, wherein said flange has a flange surface that engages said clutch release member to minimize rotation of said live roller.

29. The roller conveyor of claim 26, wherein said declutch bias means includes:

an expandable member in air or fluid flow communication with said valve, said expandable member axially moving said clutch release member.

30. The roller conveyor of claim 17, wherein said sensing means includes a photoelectric cell.

31. The roller conveyor of claim 17, wherein said sensing means includes a mechanical switch that contacts the load unit.

32. The roller conveyor of claim 17, wherein said valve is a pneumatic solenoid valve.

33. The roller conveyor of claim 17, wherein said valve is a hydraulic valve.

* * * * *